United States Patent
Wahl et al.

(10) Patent No.: US 9,937,967 B2
(45) Date of Patent: Apr. 10, 2018

(54) METHOD FOR LATERAL DYNAMIC STABILIZATION OF A SINGLE-TRACK MOTOR VEHICLE

(71) Applicant: Robert Bosch GmbH, Stuttgart (DE)

(72) Inventors: Anja Wahl, Markgroeningen (DE);
Matthias Klews, Tuebingen (DE);
Markus Lemejda, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 34 days.

(21) Appl. No.: 14/901,224

(22) PCT Filed: May 15, 2014

(86) PCT No.: PCT/EP2014/059988
§ 371 (c)(1),
(2) Date: Dec. 28, 2015

(87) PCT Pub. No.: WO2014/206642
PCT Pub. Date: Dec. 31, 2014

(65) Prior Publication Data
US 2016/0368546 A1    Dec. 22, 2016

(30) Foreign Application Priority Data

Jun. 28, 2013   (DE) .................. 10 2013 212 606

(51) Int. Cl.
*B60W 30/02*    (2012.01)
*B62D 37/00*    (2006.01)
(Continued)

(52) U.S. Cl.
CPC ............ *B62D 37/00* (2013.01); *B60W 30/04* (2013.01); *B60W 40/112* (2013.01); *B62J 27/00* (2013.01);
(Continued)

(58) Field of Classification Search
CPC ....... B62D 37/00; B62D 37/04; B60W 30/02; B60W 30/045; B60W 40/112;
(Continued)

(56) References Cited

U.S. PATENT DOCUMENTS 4,203,500 A * 5/1980 Kamiya ............... B62H 7/00
                                                        180/219
4,691,798 A * 9/1987 Engelbach ............ B62H 1/12
                                                        180/209

(Continued)

FOREIGN PATENT DOCUMENTS

| CN | 102490674 A | 6/2012 |
| CN | 102514557 A | 6/2012 |

(Continued)

OTHER PUBLICATIONS

International Search Report for PCT/EP2014/059988, dated Aug. 13, 2014.

*Primary Examiner* — Tony H Winner
(74) *Attorney, Agent, or Firm* — Norton Rose Fulbright US LLP; Gerard Messina

(57) ABSTRACT

A method for lateral dynamic stabilization of a single-track motor vehicle while negotiating a curve,—in which the presence of an unstable driving state in the vehicle lateral direction is detected and—as a function thereof, for the stabilization of the motor vehicle, at least one nozzle is activated, through which a medium is emitted perpendicularly to the wheel plane of a vehicle wheel.

20 Claims, 2 Drawing Sheets

(51) Int. Cl.
   *B62J 27/00* (2006.01)
   *B60W 30/04* (2006.01)
   *B60W 40/112* (2012.01)

(52) U.S. Cl.
   CPC ... *B60W 2030/043* (2013.01); *B60W 2300/36* (2013.01); *B60W 2300/365* (2013.01); *B60Y 2200/12* (2013.01); *B60Y 2200/126* (2013.01)

(58) Field of Classification Search
   CPC ....... B60W 2030/043; B60W 2300/36; B60W 2300/365; B60Y 2200/00; B60Y 2200/12; B60Y 2200/126
   USPC ................. 280/293, 755; 180/218, 219, 220
   See application file for complete search history.

(56) References Cited

U.S. PATENT DOCUMENTS

| | | | | |
|---|---|---|---|---|
| 7,055,843 B2* | 6/2006 | Kan | ......................... | B62J 27/00 280/291 |
| 7,384,055 B1 | 6/2008 | Halpern | | |
| 7,451,994 B2* | 11/2008 | Heitner | ................... | B62H 1/10 280/288.4 |
| 7,494,153 B2* | 2/2009 | Wang | ................... | B60R 21/0132 280/298 |
| 8,095,269 B2* | 1/2012 | Pruett | ................... | B60W 30/04 180/271 |
| 8,235,419 B1* | 8/2012 | Giarrusso | ................ | B62H 1/12 280/296 |
| 2005/0034910 A1* | 2/2005 | Hinton | ..................... | B62H 1/12 180/209 |
| 2005/0167961 A1* | 8/2005 | Murata | .................... | B62J 27/00 280/755 |
| 2008/0303258 A1* | 12/2008 | Kuo | ....................... | B62K 21/08 280/755 |
| 2015/0314781 A1* | 11/2015 | Klews | .................. | B60W 10/18 701/71 |
| 2016/0061132 A1* | 3/2016 | Hieda | ................ | B60K 31/0083 701/110 |
| 2016/0161526 A1* | 6/2016 | Miki | ....................... | B62J 99/00 701/124 |

FOREIGN PATENT DOCUMENTS

| | | | | |
|---|---|---|---|---|
| DE | 102010003951 | | 10/2011 | |
| DE | 10 2011 122 497 A1 * | | 7/2013 | ............ B60W 30/02 |
| EP | 1488974 | | 12/2004 | |

* cited by examiner

METHOD FOR LATERAL DYNAMIC STABILIZATION OF A SINGLE-TRACK MOTOR VEHICLE

BACKGROUND INFORMATION

A frequent cause of accidents of motorized two-wheelers when negotiating curves without third-party involvement is excessive oversteering or understeering, including lateral breakaway of one or both wheels. These situations are primarily provoked by excessive speed in turns, excessive accelerations in an inclined position or changes of the friction coefficient between the tires and the road. In the last-mentioned case in particular, a falling friction coefficient which rises again abruptly after a short distance may result in so-called highsiders including a rollover of the motorcycle.

In the case of double-track vehicles, extremely effective vehicle dynamics control systems are in wide use for preventing excessive oversteering or understeering. Unilateral braking as a typical possibility for intervention in double-track vehicles is not possible in two-wheelers or single-track vehicles due to their design. Only for the above-named case of excessive acceleration in an inclined position, which results in rear-end breakaway due to the slippage of the rear wheel, have traction control systems become increasingly common.

SUMMARY

The present invention relates to a method for lateral dynamic stabilization of a single-track motor vehicle while negotiating a curve,
  in which the presence of an unstable driving state in the vehicle lateral direction is detected, and
  as a function thereof, at least one actuator, in particular a nozzle, is activated for stabilizing the vehicle, the activation of which causes a medium having a velocity component directed perpendicularly to the wheel plane of a vehicle wheel to be emitted.

The present invention makes it possible to generate lateral forces acting selectively on one wheel and thus contribute to the stabilization of the single-track motor vehicle.

One advantageous embodiment of the present invention is characterized in that the unstable driving state is an oversteering or understeering of the motor vehicle.

One advantageous embodiment of the present invention is characterized in that the float angle of the motor vehicle is ascertained and that an oversteering driving state is detected as present if the float angle exceeds a predefined limiting value.

One advantageous embodiment of the present invention is characterized in that, in the case of an oversteering driving state, a nozzle attached to the rear wheel suspension on the outside of the curve is activated, via which a medium is emitted in the direction of the outside of the curve.

One advantageous embodiment of the present invention is characterized in that, in addition, the steering angle of the motor vehicle is ascertained and that an understeering driving state is detected as present if the steering angle exceeds a predefined limiting value and simultaneously the float angle falls below a predefined limiting value.

One advantageous embodiment of the present invention is characterized in that in the case of an understeering driving state, a nozzle attached to the front wheel fork on the outside of the curve is activated, via which a medium is emitted in the direction of the outside of the curve.

One advantageous embodiment of the present invention is characterized in that the medium is carbon dioxide, nitrogen, helium or compressed air, which is stored in a pressure vessel.

One advantageous embodiment of the present invention is characterized in that the medium is a combustion product, which is created by local combustion carried out close to the nozzle and is emitted through the nozzle opening.

One advantageous embodiment of the present invention is characterized in that the exiting medium also has a velocity component lying in the wheel plane pointing upward in the vertical direction of the single-track vehicle. The velocity component of the exiting medium increases the contact pressure of the tire on the roadway. This in turn has the effect of increasing the maximum possible lateral guiding force of the tire.

One advantageous embodiment of the present invention is characterized in that, in parallel to the activation of the actuator, a steering damper or steering torque actuator acting on the front wheel is activated. This activation compensates for an unintended additional steering torque.

The present invention further includes a device containing means which are designed for carrying out the method according to the present invention. This is in particular a control unit which is equipped with the program code for carrying out the method according to the present invention.

DETAILED DESCRIPTION

Figure 1:
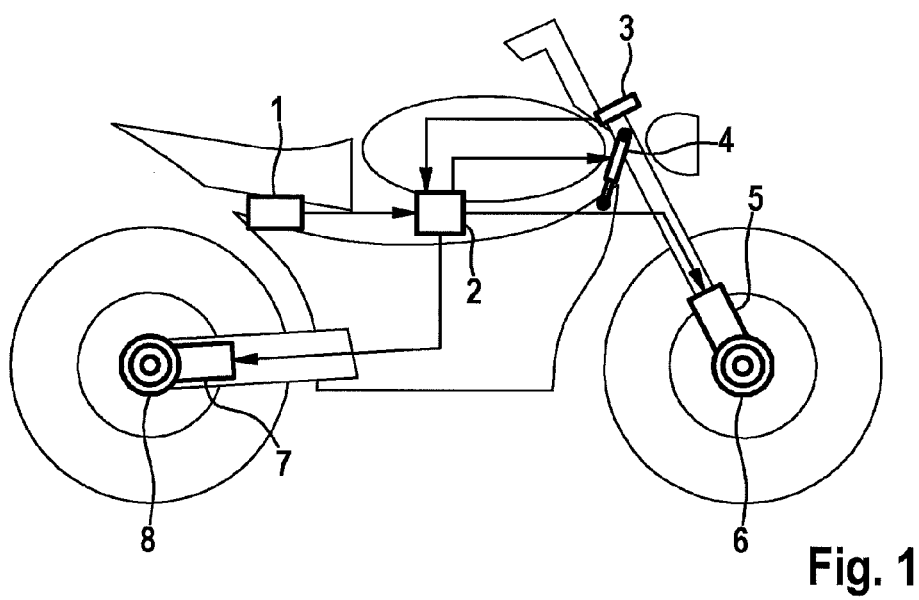
FIG. 1 shows the side view of a motorcycle, in which the most essential components which play a role for the present invention are plotted.

According to the present invention, driving situations in which the wheels threaten to break away are detected with the aid of sensors, whereupon nozzles attached to the motorcycle are activated. From these nozzles, gases are ejected, the thrust of which causes lateral forces to be introduced into the chassis frame, thus preventing the wheels from breaking away laterally.

For detecting situations including excessive oversteering or understeering, for example, a cluster of inertial sensors as well as a steering angle sensor are used. The required inertial sensors, which ascertain in particular the rotation rates of the motorcycle about the three spatial directions as well as, if necessary, also the accelerations occurring into the three spatial directions, are partially already available in modern motorcycles. The nozzles installed on the chassis frame, the openings of which point laterally to the direction of travel, create a possibility of introducing additional lateral forces into the chassis frame with the aid of an emanating reaction mass via the thrust principle and consequently prevent the wheels from breaking away laterally.

In one specific embodiment, an inertial sensor cluster is installed in the motorcycle, which is able to measure the lateral acceleration, yaw rate, roll rate and pitch rate. The wheel speeds for estimating the vehicle speed are also available as a sensor value in nearly all motorcycles. Using these values, it is then possible to estimate the float angle in a control unit. In motorized two-wheelers, the float angle typically amounts to only a few degrees during stable driving. If the float angle increases abruptly, a breakaway of the rear axle must be assumed. If in addition, a steering angle sensor is used, it is also possible to detect understeering situations in which the danger of a front wheel breaking away exists. These understeering situations are characterized in that the float angle is excessively small in the case of larger steering angles. The slip angle of the wheels may also be used as a control variable as an alternative to the float angle if appropriate sensors are present.

If a defined, possibly speed-dependent float angle limit is exceeded, the presence of critical oversteering is detected. If a defined, possibly speed-dependent steering angle limit is exceeded at the same time as a simultaneously small float angle, the presence of critical understeering is detected. The ratio of float angle and steering angle may also be considered for detecting understeering.

If one of the two critical states is present, the necessary forces for preventing a lateral breakaway of the wheels are calculated in a control unit as a function of the difference of the float angle or steering angle from the particular limit. On the rear wheel suspension and on the front fork, nozzles are attached to the right and left of the wheel axles, the outlet openings of which run along the wheel axles. These nozzles are activated based on the calculated necessary force. The greater the necessary force, the greater is also the mass flow of the medium exiting the nozzle openings. At an assumed constant exit velocity of the exiting medium v_medium for the force curve F(t) calculated by the control unit, the impulse $\Delta p = \int F(t)dt = $v_medium$\cdot \Delta m$ in the lateral direction to the wheel axles is obtained, $\Delta m$ denoting the mass emitted through the nozzle openings. This measure counteracts the excessive understeering or oversteering. If for the case of oversteering, the float angle again assumes uncritical values or for the case of understeering, the ratio of float angle and steering angle does the same, the activity of the nozzles is again stopped.

For supplying the nozzles with reaction mass, gases exiting from compressed air cylinders installed in the motorcycle are suitable, the cylinders being filled, for example, with carbon dioxide, nitrogen, helium or compressed air. An alternative option is the combustion of fuels, the combustion products of which flow out through the nozzles at high pressure according to the rocket principle. For this purpose, additional fuel containers and ignition devices must be installed.

To prevent the fork from being turned unintentionally during an abrupt triggering of the nozzle activity on the front axle, a steering damper or steering torque actuator may be installed on the fork. These components may compensate for the unintended additional steering torque.

In one embodiment of the present invention, cold gas generators attached in the area of the wheel suspensions are activated in the case of critical oversteering or understeering. As a result of the thrust of the outflowing gases, lateral forces act on the chassis frame, which compensate for the lack of lateral guiding forces of the tires, thus preventing the wheels from breaking away laterally.

On the rear wheel suspension and also on the front fork, if necessary, at least one cold gas generator is attached to the left and to the right of the wheel axles, the outlet openings of which are parallel to the wheel axles. The valves for the mass flow through the outlet openings are activated according to the ascertained necessary force. Typically, the valves of known cold gas generators may only be completely opened or closed. However, these opening and closing operations may also occur in intervals of milliseconds. Furthermore, the force of the outflowing gas will decrease steadily when the valves are opened due to the declining internal pressure of the gas container. Therefore, it is advantageous if the impulse $\Delta p = \int f(t)dt =$ v_medium$\cdot \Delta m$ is implemented by a pulse sequence, the individual pulse including an opening of the valve and a subsequent fast closing operation. These lateral impulses caused by the cold gas generators represent no significant additional load for the chassis frame, since in principle, only one lateral guiding force of the tire, which is possibly too small, is compensated.

To ensure less endangerment to the environment due to the abrupt exit of gases at high pressure, the outlet openings may be designed to have a preferably wide fanning emission characteristic, so that the pressure decreases rapidly with increasing distance from the openings. It is also conceivable that the outlet openings are not attached in parallel to the wheel plane, but are instead attached rotated upward. Since the opening typically occurs when negotiating a curve, i.e., in a significantly inclined position, the opening of the outlet nozzle is then pointed at least partly upward during the outflow of the gas. Such an attachment of the outlet nozzles causes the desired lateral component of the force to decrease; however, the pressure on the contact point of the wheel is increased, which also counteracts a lateral drift of the wheel.

The side view of a motorcycle is illustrated in FIG. 1. Here, an inertial sensor system installed in or on the motorcycle is denoted by reference numeral 1. Reference numeral 2 denotes a control unit in which, for example, the algorithms are run for situation detection and for calculating the nozzle interventions as well as for steering stabilization. Reference numeral 3 denotes a steering angle sensor and reference numeral 4 denotes an active steering damper or steering torque actuator. Reference numeral 5 denotes a mass memory as well as the actuators for the nozzle control on the front wheel; reference numeral 6 denotes one of the nozzles on the front wheel. On the rear wheel, reference numeral 7 denotes a mass memory and the actuators for the nozzle control. Reference numeral 8 denotes one of the nozzles on the rear wheel.

Figure 2:
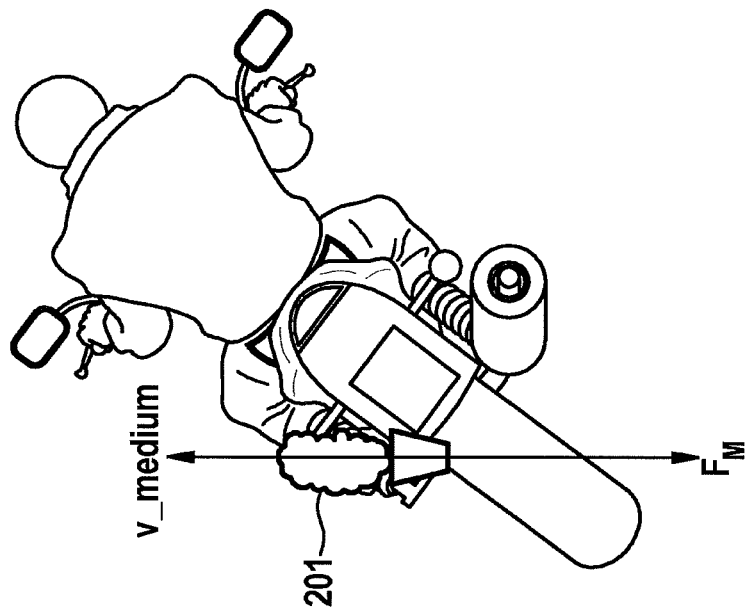
FIG. 2 shows the rear view of a motorcycle which is inclined while negotiating a curve. In the left drawing, a medium escapes from a nozzle perpendicularly to the wheel plane. In the drawing on the right, the escaping medium additionally has a velocity component pointing in the vertical direction of the motorcycle.
Figure 2:
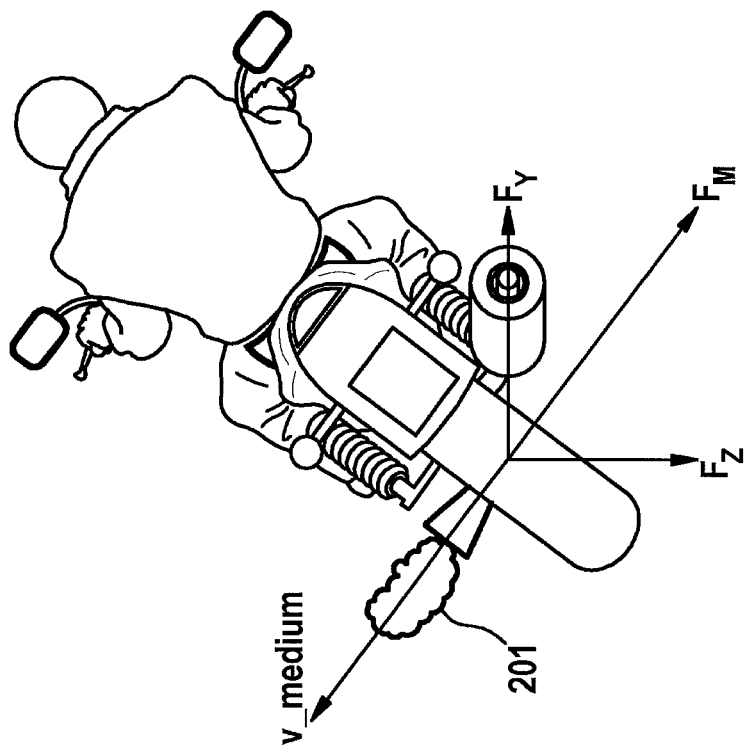

In FIG. 2, the rear view of a motorcycle in an inclined position while negotiating a curve is shown in each of the left and right drawings. Outflow direction 201 of the gas flowing out at speed v_medium is additionally plotted. In the left drawing of FIG. 2, the gas flows out perpendicularly to the wheel plane of the rear wheel and generates reaction force Fm acting on the rear wheel. In the roadway plane, this force has a component Fy directed in the direction of the inside of the curve as well as a component Fz directed perpendicularly to the roadway surface, increasing the contact pressure of the tire on the roadway. In the drawing on the right of FIG. 2, the gas does not flow out of the nozzle perpendicularly to the wheel plane of the rear wheel, but instead has a relatively large velocity component directed in parallel to the wheel plane. In the example shown in FIG. 2, the result of this is that the gas exits perpendicularly upward due to the inclination of the motorcycle. For this reason, reaction force Fm also acts perpendicularly from above and strongly increases the contact pressure of the tire on the roadway surface.

What is claimed is:

1. A method for lateral dynamic stabilization of a single-track motor vehicle while negotiating a curve, comprising:
    detecting a presence of an unstable driving state in a vehicle lateral direction; and as a function of the detecting, activating at least one actuator for stabilizing the motor vehicle, the activating causing a medium having a velocity component perpendicular to a wheel plane of a vehicle wheel to be emitted;
wherein the unstable driving state is one of an oversteering and an understeering of the motor vehicle.

2. A method for lateral dynamic stabilization of a single-track motor vehicle while negotiating a curve, comprising:
detecting a presence of an unstable driving state in a vehicle lateral direction;
as a function of the detecting, activating at least one actuator for stabilizing the motor vehicle, the activating causing a medium having a velocity component perpendicular to a wheel plane of a vehicle wheel to be emitted; and
ascertaining a float angle of the motor vehicle, wherein an oversteering driving state is detected as present if the float angle exceeds a predefined limiting value.

3. The method as recited in claim 2, wherein, in the case of the oversteering driving state, a nozzle attached to a rear wheel suspension on an outside of the curve is activated, via which the medium having the velocity component pointing in a direction of the outside of the curve is emitted.

4. The method as recited in claim 2, wherein in addition, a steering angle of the motor vehicle is ascertained and an understeering driving state is detected as present if the steering angle exceeds a predefined limiting value and simultaneously the float angle falls below a predefined limiting value.

5. The method as recited in claim 4, wherein, in the case of the understeering driving state, a nozzle attached to a front wheel fork on an outside of the curve is activated, via which the medium having the velocity component pointing in a direction of the outside of the curve is emitted.

6. A method for lateral dynamic stabilization of a single-track motor vehicle while negotiating a curve, comprising:
detecting a presence of an unstable driving state in a vehicle lateral direction; and
as a function of the detecting, activating at least one actuator for stabilizing the motor vehicle, the activating causing a medium to be emitted, wherein the medium has a velocity component perpendicular to a wheel plane of a vehicle wheel and a velocity component directed in parallel to the wheel plane pointing in an upwardly directed vertical direction of the single-track motor vehicle.

7. A device for lateral dynamic stabilization of a single-track motor vehicle while negotiating a curve, comprising:
a sensor for detecting a presence of an unstable driving state in a vehicle lateral direction; and
a controller for, as a function of the detecting, activating at least one actuator for stabilizing the motor vehicle, wherein the activating causes a medium to be emitted, the emission generating a force that acts on a wheel of the vehicle and that includes a velocity component acting on the wheel perpendicularly to a wheel plane of the wheel.

8. A method for lateral dynamic stabilization of a single-track motor vehicle while negotiating a curve, comprising:
detecting a presence of an unstable driving state in a vehicle lateral direction; and
as a function of the detecting, activating at least one actuator for stabilizing the motor vehicle, wherein the activating causes a medium to be emitted, the emission generating a force that acts on a wheel of the vehicle and that includes a velocity component acting on the wheel perpendicularly to a wheel plane of the wheel.

9. The method as recited in claim 8, wherein the medium includes one of carbon dioxide, nitrogen, helium, and compressed air, and wherein the medium is stored in a pressure vessel.

10. The method as recited in claim 8, wherein the medium is a combustion product created by a local combustion carried out close to a nozzle and is emitted through a nozzle opening.

11. The method as recited in claim 8, wherein, in parallel to the activation of the actuator, one of a steering damper and a steering torque actuator acting on a front wheel is activated.

12. The method as recited in claim 8, wherein:
the detecting includes detecting a critical driving maneuver that includes (a) an unstable negotiating of a curve, (b) a critical understeering, (c) a critical oversteering, or (d) a combination of two or more of (a)-(c); and
the activation is in response to the detection of the critical driving maneuver.

13. The method as recited in claim 12, further comprising:
activating a steering damper or a steering torque actuator that acts on a front wheel in response to the detection of the critical driving maneuver in response to which the activation causing the medium emission is performed.

14. The method as recited in claim 12, wherein the critical driving maneuver includes the unstable negotiating of the curve.

15. The method as recited in claim 12, wherein the critical driving maneuver includes the critical understeering.

16. The method as recited in claim 15, wherein the critical understeering is detected by detection of simultaneous presence of a float angle below a float angle threshold and a steering angle above a steering angle threshold.

17. The method as recited in claim 16, wherein the steering angle threshold is speed dependent.

18. The method as recited in claim 12, wherein the critical driving maneuver includes the critical oversteering.

19. The method as recited in claim 18, wherein critical oversteering is detected by detection of a float angle that is above a threshold.

20. The method as recited in claim 19, wherein the threshold is speed dependent.

* * * * *